US008335508B2

(12) United States Patent
Doherty et al.

(10) Patent No.: US 8,335,508 B2
(45) Date of Patent: Dec. 18, 2012

(54) SYSTEM AND METHOD FOR MONITORING AND REPORTING TELEMATICS UNIT COMMUNICATION NETWORK SYSTEM ACQUISITION AND SCANNING PERFORMANCE

(75) Inventors: James Doherty, Wyandotte, MI (US); Kevin R. Krause, Plymouth, MI (US); Ki Hak Yi, Windsor (CA); Ayaz S. Kassam, Toronto (CA)

(73) Assignee: General Motors LLC, Detroit, MI (US)

( * ) Notice: Subject to any disclaimer, the term of this patent is extended or adjusted under 35 U.S.C. 154(b) by 974 days.

(21) Appl. No.: 12/188,128

(22) Filed: Aug. 7, 2008

(65) Prior Publication Data

US 2010/0035602 A1 Feb. 11, 2010

(51) Int. Cl.
*H04W 4/00* (2009.01)

(52) U.S. Cl. ............... 455/434; 455/569.2; 455/575.9; 455/435.2; 455/425; 455/67.11

(58) Field of Classification Search .......... 455/420, 455/456.1, 557, 422.1–435.3, 67.11–67.16, 455/569.1, 569.2, 575.9
See application file for complete search history.

(56) References Cited

U.S. PATENT DOCUMENTS

| | | | | |
|---|---|---|---|---|
| 3,729,595 A * | 4/1973 | Sarati et al. | ................... | 455/403 |
| 3,913,017 A * | 10/1975 | Imaseki | ...................... | 455/422.1 |
| 5,257,400 A * | 10/1993 | Yoshida | ......................... | 455/434 |
| 6,119,003 A * | 9/2000 | Kukkohovi | ................ | 455/435.2 |
| 6,332,077 B1 * | 12/2001 | Wu et al. | ..................... | 455/432.1 |
| 6,580,916 B1 * | 6/2003 | Weisshaar et al. | ......... | 455/456.1 |
| 6,600,922 B1 * | 7/2003 | Aoki | .......................... | 455/432.1 |
| 7,305,236 B2 | 12/2007 | Schwinke et al. | | |
| 7,532,880 B2 * | 5/2009 | Mazzara, Jr. | .................. | 455/418 |
| 7,917,145 B2 * | 3/2011 | Mahany et al. | ............. | 455/435.1 |
| 7,949,375 B2 * | 5/2011 | Kortge | ........................ | 455/569.2 |
| 8,160,547 B2 * | 4/2012 | Yi et al. | ........................ | 455/410 |
| 2003/0087642 A1 | 5/2003 | Mazzara | | |
| 2003/0190030 A1 * | 10/2003 | Alton | ............................ | 379/219 |
| 2004/0142693 A1 * | 7/2004 | Feder et al. | .................... | 455/443 |
| 2004/0203436 A1 * | 10/2004 | Oesterling | ................. | 455/67.11 |
| 2004/0203728 A1 * | 10/2004 | Schwinke et al. | ............ | 455/425 |
| 2005/0090275 A1 * | 4/2005 | Wang | ............................. | 455/512 |
| 2005/0164695 A1 * | 7/2005 | Kamdar et al. | ............... | 455/420 |
| 2005/0208936 A1 * | 9/2005 | Sumcad et al. | ............... | 455/423 |
| 2006/0079219 A1 | 4/2006 | Nicolini | | |
| 2007/0112504 A1 | 5/2007 | Krause et al. | | |
| 2007/0184835 A1 * | 8/2007 | Bitran et al. | .................. | 455/434 |
| 2009/0063174 A1 * | 3/2009 | Fricke | .............................. | 705/1 |
| 2009/0181664 A1 * | 7/2009 | Kuruvilla et al. | ............. | 455/423 |
| 2010/0124924 A1 * | 5/2010 | Cheng et al. | ................... | 455/434 |
| 2010/0167727 A1 * | 7/2010 | Madhavan et al. | ............ | 455/434 |
| 2010/0234021 A1 * | 9/2010 | Ngai et al. | ..................... | 455/433 |
| 2011/0039556 A1 * | 2/2011 | Yi et al. | ........................ | 455/434 |
| 2011/0039559 A1 * | 2/2011 | Yi et al. | ...................... | 455/435.2 |

* cited by examiner

*Primary Examiner* — Sharad Rampuria
(74) *Attorney, Agent, or Firm* — Dierker & Associates, P.C.

(57) ABSTRACT

A system and method for monitoring and reporting telematics unit communication network system acquisition and scanning performance is disclosed herein. An example of the method includes monitoring a scan of all cellular networks that are available to a vehicle telematics unit, and during the monitoring, recognizing a predetermined trigger. In response to the predetermined trigger, a memory buffer in the telematics unit stores data associated with at least one of performance or outcome of the scan. At least some of the stored data is transmitted from the telematics unit to a server in selective communication with the telematics unit.

20 Claims, 2 Drawing Sheets

SYSTEM AND METHOD FOR MONITORING AND REPORTING TELEMATICS UNIT COMMUNICATION NETWORK SYSTEM ACQUISITION AND SCANNING PERFORMANCE

TECHNICAL FIELD

The present disclosure relates generally to a system and a method for monitoring and reporting telematics unit communication network system acquisition and scanning performance.

BACKGROUND

In-vehicle telematics units utilize cellular networks to transmit and/or receive voice or data transmissions. The transmissions may be personal calls to and from the vehicle user(s), or may be service related calls/data transfers to and from a call center or other telematics service provider. Regardless of the nature of the transmission, each transmission adds to the volume of traffic on the cellular network, which may lead to network resource problems.

SUMMARY

A system and method for monitoring and reporting telematics unit communication network system acquisition and scanning performance is disclosed herein. An example of the method includes monitoring a scan of all cellular networks that are available to a vehicle telematics unit, and during the monitoring, recognizing a predetermined trigger. In response to the predetermined trigger, a memory buffer in the telematics unit stores data associated with at least one of performance or outcome of the scan. At least some of the stored data is transmitted from the telematics unit to a server in selective communication with the telematics unit.

BRIEF DESCRIPTION OF THE DRAWINGS

Features and advantages the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
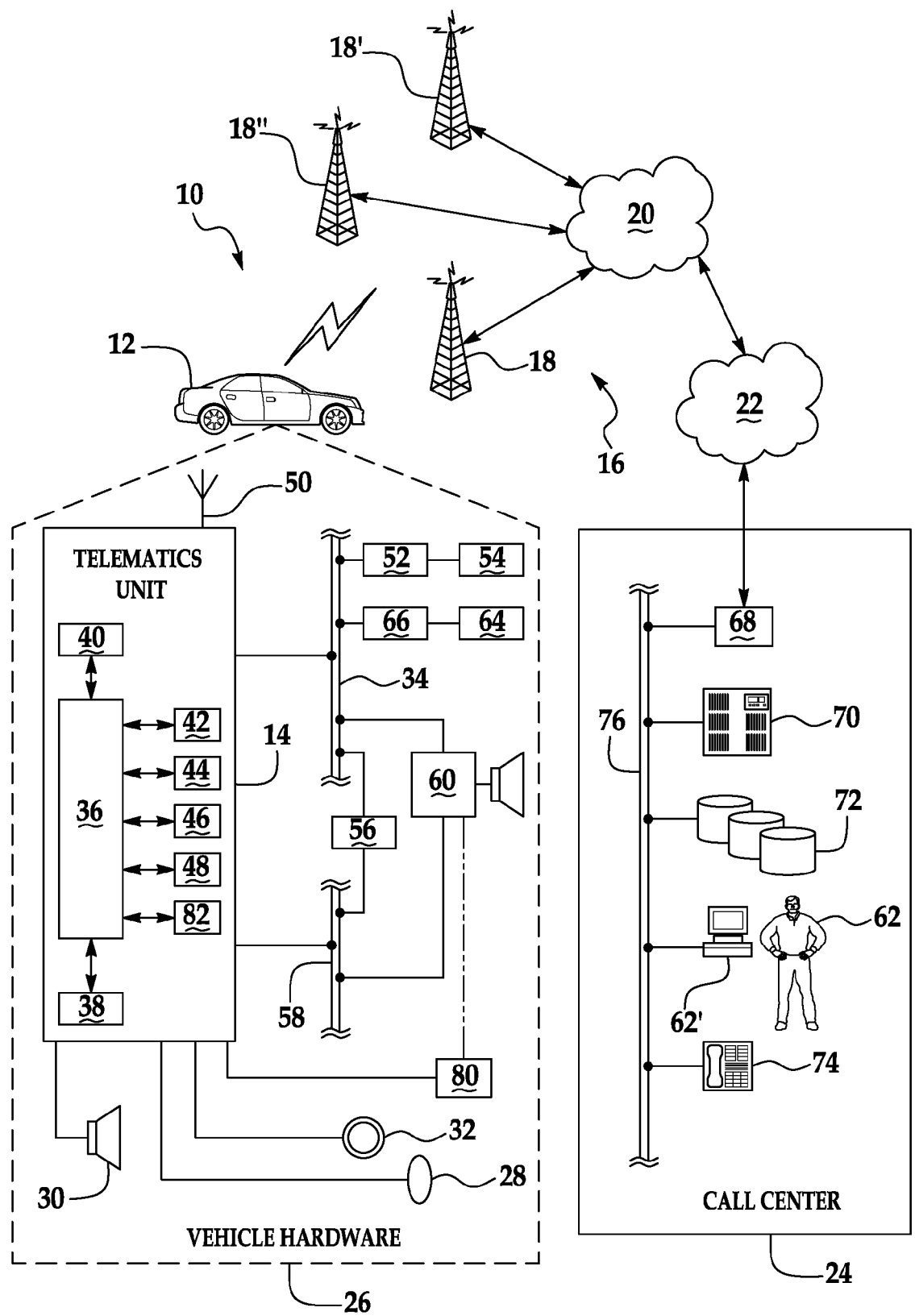
FIG. 1 is a system for monitoring and reporting telematics unit communication network system acquisition and scanning performance.

Examples of the method and system disclosed herein advantageously enable a telematics unit to monitor a scan of all available communication networks (i.e., cellular networks, short range wireless communication networks, etc.), whether or not the telematics unit actually utilizes the network for voice and/or data transmissions. It is believed that monitoring communication network system acquisition and scanning activities enables valuable network and device behavior data to be obtained, thereby potentially enabling networks and/or telematics system cellular acquisition to be refined to reduce network resource issues and improve network performance. Generally, the monitoring and scanning occurs in the background, thereby enabling simultaneous use of the telematics unit features.

The monitoring and reporting method disclosed herein also advantageously enables the telematics unit to proactively make intelligent decisions concerning connectivity and communication, and automatically or when queried, send reports about a variety of potential cellular network related concerns to the call center and/or the cellular service provider. The received data may enable the call center or cellular service provider to identify problems with wireless carrier systems more quickly, adjust systems and choice of carriers for better connectivity, and send any changes back to the telematics unit (e.g., updates to the in-vehicle mobile phone, modem, etc.). In addition, an application, server and/or a call center could ascertain connectivity issues of specific cellular markets. As a non-limiting example, the history at a particular network border may be analyzed in order to precisely refine that network.

It is to be understood that, as used herein, the term "user" includes vehicle owners, operators, and/or passengers. It is to be further understood that the term "user" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. As such, indirect communication may include communication between two components with additional component(s) located therebetween.

Referring now to FIG. 1, the system 10 includes a vehicle 12, a telematics unit 14, a wireless carrier/communication system 16 (including, but not limited to, one or more cellular networks which includes one or more towers 18, 18', 18" and one or more base stations and/or mobile switching centers (MSCs) 20 operated by one or more cellular service providers), one or more land networks 22, and one or more call centers 24. In an example, the wireless carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a Bluetooth® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be a short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications preferably use radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58. The audio component 60 may also include software for receiving alerts from other vehicles 12 using the method(s) disclosed herein.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, and/or the like. Non-limiting example sensor interface modules 66 include powertrain control, climate control, body control, and/or the like.

In a non-limiting example, the vehicle hardware 26 includes a display 80, which may be operatively connected to the telematics unit 14 directly, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system/network or any other suitable wireless system/network that transmits signals between the vehicle hardware 26 and land network 22. As previously mentioned, wireless carrier/communication system 16 includes one or more cell towers 18, 18', 18", base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18, 18', 18" may be co-located at the same site or they could be remotely located, and a single base station 20 may be coupled to various cell towers 18, 18', 18" or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

A cellular service provider generally owns and/or operates the wireless carrier/communication system 16. It is to be understood that, although a cellular service provider (not shown) may be located at or work in conjunction with the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide one or more cellular and/or telematics service(s) to the user.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions and, according to the example shown here, generally includes one or more switches 68, servers 70, databases 72, live and/or automated advisors 62, 62', as well as a variety of other telecommunication and computer equipment 74 that is known to those skilled in the art. These various call center components are coupled to one another via a network connection or bus 76, such as the one (vehicle bus 34) previously described in connection with the vehicle hardware 26.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or an automated response system 62', and data transmissions are passed on to a modem or other piece of equipment (not shown) for demodulation and further signal processing. The modem preferably includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

Figure 2:
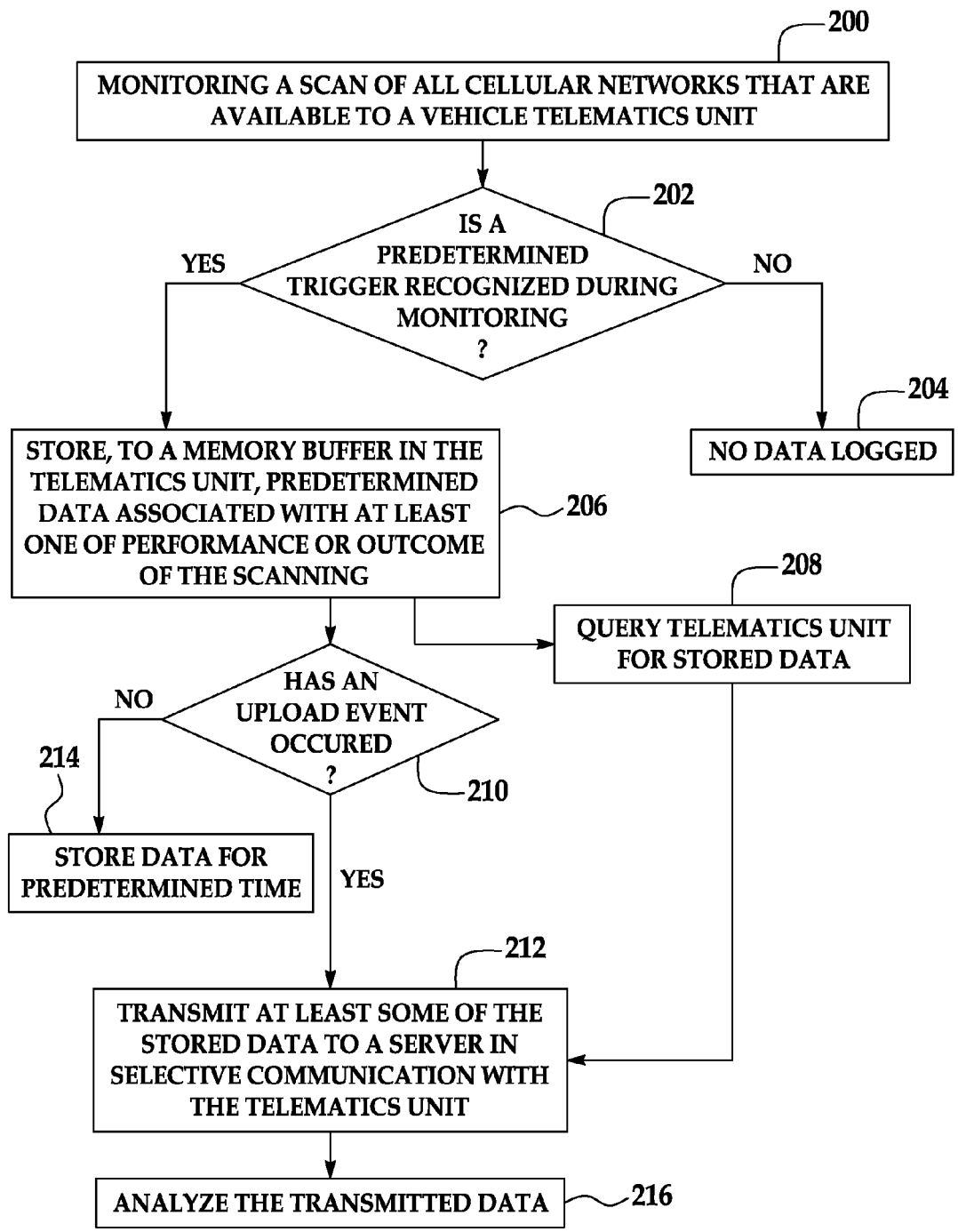
FIG. 2 is a flow diagram depicting an example of the method for monitoring and reporting telematics unit communication network system acquisition and scanning performance.

Referring now to FIG. 2, an example of the method for monitoring and reporting system acquisition and scanning performance is depicted. The method is generally performed using a system 10 similar to that shown in FIG. 1.

The vehicle telematics unit 14 monitors a scan of all cellular networks that are available, as shown at reference numeral 200. The telematics unit 14 is configured to monitor whenever a scan or communication network acquisition is being performed and/or any background tasks performed by the network access device (not shown) in the vehicle telematics unit 14. In some instances, the vehicle telematics unit 14 scans the available cellular networks whenever in awake mode, and in other instances, the telematics unit 14 scans the available cellular networks at predetermined intervals that are set within the cellular chipset/component 40. Such intervals may be set by the manufacturer, and thus are integral with the cellular chipset/component 40.

During the scan, the telematics unit 14, via processor 36, monitors the available networks for service or protocol related additions and/or changes. Scanning all of the available cellular networks is desirable so that a desirable and appropriate network is selected for a particular user. An appropriate network may depend, at least in part, on the advantages a particular network offers, preferences of the user and/or the costs associated with using a particular network. Monitoring the scanning is desirable so that changes and or additions affecting one or more networks (and potentially telematics unit 14 connectivity) are detected and analyzed. Furthermore, by monitoring the scan of all of the available networks in an area, the call center 24 and/or cellular service provider is able to compare and contrast the problems and/or advantages of each network and to analyze how the telematics unit 14 handles evaluating and selecting a network.

The telematics unit 14 is programmed to recognize one or more predetermined or predefined triggers during the monitoring operation, as shown at reference numeral 202. Such triggers may be programmed by the manufacturer of the telematics unit 13 as part of the embedded software. It is to be understood that data is not logged in/stored if one or more of the triggers is not recognized during monitoring, as shown at reference numeral 204.

However, if a trigger is recognized during the monitoring, the processor 36 selects data and transmits such data to the memory 38 for storage therein, as shown at reference numeral 206. Non-limiting examples of the triggers include a change in a cellular system identification number, a loss of a cellular signal, a state of no cellular service, a power transition change, an ignition cycle, exiting DRx mode, entering DRx mode, a background scan on a predetermined network based on a cellular system identification number, a network change, a new network parameter, a change in a network parameter, a pilot channel change, a call failure, and combinations thereof. As non-limiting examples, recognition of a change in an existing network parameter may involve recognizing that the overhead messaging within one or more of the scanned networks has changed (e.g., a new registration interval), or recognizing that the frequency of one or more of the scanned networks has changed.

The recognition of any of these changes or conditions (i.e., triggers) during monitoring triggers the telematics unit 14 to log/store data that is related to the performance or outcome of the scan. The data may be generally related to the particular scanning task (e.g., a timestamp at the beginning and end of the scan, a GPS location of the vehicle 12 at the beginning and end of the scan, the type of scan, or the like, or combinations thereof), or may be related to the particular networks scanned (e.g., a cellular system identification number at the beginning and end of the scan, a received signal strength at the beginning and end of the scan, a frame error rate at the beginning and end of the scan, a pilot strength to interference ratio at the beginning and end of the scan, a power level at the beginning and end of the scan, a loss of service during the scan, a time at which a network access device is unavailable, a protocol version revision, information related to a registration period, or the like, or combinations thereof). The logged/stored data may be a combination of general scan related data and particular network related data. In one non-limiting example, the logged/stored data is related to the attempted acquisition of one of the cellular networks, and the storage of such data is triggered by a change in the cellular system identification number.

In one example, data is collected throughout the entire scanning period, and is stored in a temporary cache during the scan. Some or all of the data in the temporary cache will be logged/stored in the memory 38 if one or more of the previously mentioned triggers is recognized during monitoring of the scan. If the trigger(s) is/are not recognized during a particular scan, the data will be deleted from the temporary cache. If the trigger is recognized, at least some of the collected data is transferred form the temporary cache to the memory 38. In another example, the data is collected and stored in the memory 38 after the predetermined trigger is recognized, without using a temporary cache.

In some instances, all of the data in the temporary cache is stored in the memory 38 of the telematics unit 14. In other instances, the data that is logged/stored in the memory 38 may depend, at least in part, on the trigger that is recognized and/or the network associated with the particular trigger that is recognized. For example, if during the scan it is recognized that network "A" has a power transition change, the data stored in response to the power transition change trigger may be the timestamp of the monitored scan, the vehicle 12 location during at the beginning and end of the monitored scan, the power level for network "A" at the beginning and end of the monitored scan, and the time at which the power transition change was noticed. Furthermore, if more than one trigger is recognized during the monitoring of a single scanning period, data related to each trigger may be stored. For example, if the monitoring recognizes both a protocol version revision and then a loss of service, the data stored in response to such triggers may include the timestamp of the monitored scan, the GPS location of the vehicle 12 at the beginning and end of the monitored scan, the cellular system identification numbers for each network at the beginning and end of the monitored scan, the received signal strength at the beginning and end of the monitored scan for the network which lost service, a frame error rate at the beginning and end of the monitored scan for the network which lost service, a pilot strength to interference ratio at the beginning and end of the monitored scan for the network which lost service, a time at which the service is lost, and the protocol version at the beginning and end of the monitored scan or at the beginning of the scan and when service is lost.

If there are overlapping triggers, such as a scan task occurring immediately followed by a network change, then the initial logging would be triggered by the scan task, but as the second trigger is recognized, the logging continues until the logging for the second trigger is satisfied. In other words, when multiple triggers are recognized, data collection is continued until all the data required for both triggers is logged.

It is to be understood that the telematics unit 14 may be configured to log data when in an idle state (e.g., cellular chipset/component 40 is not in use or is searching for service) or when in a traffic state (e.g., when a user is on a call or data is being transmitted, for example, to the call center 24). Since multiple networks are monitored during scanning, the data that is logged/stored in response to the trigger(s) may be linked in the memory 38 to the network associated with the data. For example, the memory 38 may have a folder for network "A" and any data associated therewith is stored in the folder. It is to be understood that the memory 38 may be programmed via the call center 24 to sort the received data in a desirable manner. While this is one implementation of data storage, it is to be understood that the data may be stored in any desirable manner. For example, the data may be organized by the telematics unit's behavior on a particular network.

The data in the memory 38 may be stored for a predetermined time, indefinitely, or until such data is transferred to an entity outside the vehicle 12 (e.g., to the call center 24).

The stored data may be transferred to a server, for example, server 70 at the call center 24, for analysis. Data transfer may be accomplished via a cleared number call, packet data, circuit switched data or short messaging service (SMS). In one instance, a notification may be sent to the server 70 after a certain condition/parameter/criteria is recognized, indicating to the server 70 that data logging has been initiated. In this example, an SMS may be sent as an alert, but the actual logged data is not sent automatically. Rather, the server 70 (after receiving the alert) may retrieve the detailed data from the unit 145 as necessary or desired.

In other instances, such a data transfer may take place in response to a request from the server 70 (as shown at reference numerals 208 and 212), or may be in response to recognition of an upload event (as shown at reference numerals 210 and 212).

In the example shown at boxes 208 and 212, the telematics unit 14 may be queried for transmission of at least some of the stored data. The request may be for all of the data in the memory 38, all of the data stored between a predetermined time period (e.g., in the last 6 months), some or all of the data stored related to a particular network, or some or all of the data related to a particular trigger. It is to be understood that the telematics unit 14 is programmed to respond to such detailed queries. Generally, querying the telematics unit 14 is performed as a back-end function of the call center 24. It is to be understood that the data may be taken directly from the telematics unit 14, or it may be transmitted via the wireless communication system 16.

As previously mentioned, the stored data may also be transferred to the server 70 automatically by an automatic upload mechanism 82 (shown in FIG. 1) located in the telematics unit 14. This mechanism 82 is programmed to recognize one or more upload events, and upon recognizing such events to transmit stored data to the server 70 (shown at reference numerals 210 and 212). It is to be understood that in response to the recognition of the upload event, the telematics unit established data communication with the server 70 so that the automatic upload mechanism 82 transmits the data thereto. Depending, at least in part, on how the upload trigger is configured, some or all of the stored data may be transmitted in response to the recognition of the upload trigger.

The upload event may be a request (e.g., by the vehicle user, the advisor 62, 62' or a representative of the cellular service provider), a timestamp (e.g., at midnight everyday), a vehicle 12 location (e.g., every time the vehicle 12 returns to its garage address), when a threshold level of memory 38 is exceeded, or combinations thereof. The upload event may also be a criteria based upload event in which the occurrence of some predefined criteria triggers the upload of the data. Non-limiting examples of the criteria that may trigger data upload include a time to acquire a network is greater than a predetermined time, a signal is lost for more than a predetermined time, an acquired network changes a predetermined number of times in a predetermined time frame, a predetermined parameter (e.g., protocol version revision) is recognized, and combinations thereof.

One or more of the upload events may occur as the scanning is being performed. It is to be understood however, that data upload may also occur after scanning is complete or prior to the initiation of another scanning task. Generally, the time of the upload depends, at least in part, on the timing of the upload event.

The upload event or the criteria defining the upload event is generally programmed and/or turned on in the telematics unit 14 by the call center 24. Default upload events may be programmed, and then may be subsequently altered such that uploading is tailored to the specific telematics unit 14. Such programming alterations may be accomplished by the call center 24 remotely.

If an upload event does not take place, it is to be understood that the data may be stored in the memory 38 for a predetermined time, as shown at reference numeral 214. This time frame may be indefinite, until a memory 38 threshold is exceeded, or for a fixed period (e.g., six months from the log in date).

When the stored data is transmitted to the server 70, authorized persons (e.g., call center 24 employees, vehicle 12 and/or telematics unit 14 manufacturers, and/or cellular service provider employees) may access and analyze the received data, as shown at reference numeral 216. The data may be used to, for example, refine an existing or create a new communication network system acquisition algorithm of the telematics unit 14, refine an existing or create a new scanning algorithm of the telematics unit 14, improve the availability of the telematics unit 14 on one or more of the cellular networks, identify at least one problem associated with one or more of the cellular networks available to the telematics unit 14, or map a cellular boundary. As such, the method disclosed herein may advantageously be used to revise the network(s) and/or the telematics unit 14 in order to enhance the services that are available to the user.

While several examples have been described in detail, it will be apparent to those skilled in the art that the disclosed examples may be modified. Therefore, the foregoing description is to be considered exemplary rather than limiting.

The invention claimed is:

1. A method for monitoring and reporting communication network system acquisition and scanning performance, comprising:
   scanning all communication networks that are available to a vehicle telematics unit whether or not the telematics unit utilizes the communication network;
   monitoring the scan for service or protocol related changes;
   during the monitoring, recognizing a predetermined trigger, the predetermined trigger being selected from a change in a cellular system identification number, a loss of a cellular signal, a state of no cellular service, a power transition change, an ignition cycle, entering DRx mode, exiting DRx mode, a background scan on a predetermined network based on a cellular system identification number, a network change, a new network parameter, a change in a network parameter, a pilot channel change, a call failure, and combinations thereof;
   in response to the predetermined trigger, storing, to a memory buffer in the telematics unit, data associated with at least one of performance or outcome of the scan, the data is selected from a cellular system identification number at a beginning and an end of the scan, a timestamp at a beginning and an end of the scan, a GPS location at a beginning and an end of the scan, a received signal strength at a beginning and an end of the scan, a frame error rate at a beginning and an end of the scan, a pilot strength to interference ratio at a beginning and an end of the scan, a power level at a beginning and an end of the scan, a loss of service, a time at which a network access device is unavailable, a protocol version revision, information related to a registration period, a type of scan, and combinations thereof; and
   transmitting at least some of the stored data from the telematics unit to a server in selective communication with the telematics unit.

2. The method as defined in claim 1 wherein prior to transmitting the stored data, the method further comprises querying the telematics unit for the at least some of the stored data, and wherein transmitting is accomplished in response to the querying.

3. The method as defined in claim 1 wherein transmitting is accomplished via an automatic upload mechanism which transmits the at least some of the stored data in response to an upload event.

4. The method as defined in claim 3 wherein the upload event is selected from a user request, a timestamp, a vehicle location, exceeding a threshold level of the memory buffer, or combinations thereof.

5. The method as defined in claim 3 wherein the upload event is a criteria based upload event such that the transmitting occurs if a predetermined criteria is met.

6. The method as defined in claim 5 wherein the predetermined criteria is selected from: a time to acquire a network is greater than a predetermined time, a signal is lost for more than a predetermined time, an acquired network changes a predetermined number of times in a predetermined time frame, if a predetermined parameter is recognized, and combinations thereof.

7. The method as defined in claim 1, further comprising analyzing the at least some of the stored data.

8. The method as defined in claim 7, further comprising refining an existing communication network system acquisition algorithm of the telematics unit, an existing scanning algorithm of the telematics unit, or combinations thereof in response to the analysis.

9. The method as defined in claim 7, further comprising creating a new communication network system acquisition algorithm for the telematics unit, a new scanning algorithm for the telematics unit, or combinations thereof in response to the analysis.

10. The method as defined in claim 7, further comprising improving availability of the telematics unit on a cellular network associated therewith in response to the analysis.

11. The method as defined in claim 7, further comprising identifying at least one problem associated with a cellular network used by the telematics unit in response to the analysis.

12. The method as defined in claim 7, further comprising mapping a cellular boundary in response to the analysis.

13. A system for monitoring and reporting communication network system acquisition performance, comprising:
a telematics unit configured to monitor a scan of all available communication networks whether or not the telematics unit utilizes the communication network and recognize a predetermined trigger during the monitoring, the predetermined trigger being indicative of a service or protocol related change, and the predetermined trigger being selected from a change in a cellular system identification number, a loss of a cellular signal, a state of no cellular service, a power transition change, an ignition cycle, entering DRx mode, exiting DRx mode, a background scan on a predetermined network based on a cellular system identification number, a network change, a new network parameter, a change in a network parameter, a pilot channel change, a call failure, and combinations thereof;
a memory buffer operatively connected to the telematics unit, the memory buffer configured to store data associated with at least one of performance or outcome of the scan in response to a signal received by the telematics unit after recognition of the predetermined trigger, the data being selected from a cellular system identification number at a beginning and an end of the scan, a timestamp at a beginning and an end of the scan, a GPS location at a beginning and an end of the scan, a received signal strength at a beginning and an end of the scan, a frame error rate at a beginning and an end of the scan, a pilot strength to interference ratio at a beginning and an end of the scan, a power level at a beginning and an end of the scan, a loss of service, a time at which a network access device is unavailable, a protocol version revision, information related to a registration period, a type of scan, and combinations thereof; and
a server in selective communication with the telematics unit and configured to receive at least some of the stored data from the telematics unit.

14. The system as defined in claim 13, further comprising a telematics unit manufacturer, a telematics service provider, or a cellular service provider configured to analyze the received data.

15. The system as defined in claim 13, further comprising a call center configured to query the telematics unit for the at least some of the stored data.

16. The system as defined in claim 13 wherein the telematics unit includes an automatic upload mechanism configured to transmit the at least some of the stored data in response to an upload event.

17. The system as defined in claim 16 wherein the upload event is selected from a user request, a timestamp, a vehicle location, exceeding a threshold level of the memory buffer, a criteria based upload event such that the at least some of the data is received if a predetermined criteria is met, or combinations thereof.

18. The system as defined in claim 17 wherein the predetermined criteria is selected from: a time to acquire a network is greater than a predetermined time, a signal is lost for more than a predetermined time, an acquired network changes a predetermined number of times in a predetermined time frame, if a predetermined parameter is recognized, and combinations thereof.

19. A method for monitoring and reporting communication network system acquisition and scanning performance, comprising:
scanning multiple cellular networks that are available to a vehicle telematics unit whether or not the telematics unit utilizes the communication network;
recording scanning results in response to a predetermined trigger, the scanning results including at least a first result relating to a first network of the multiple networks and a second result relating to a second network of the multiple networks, and the predetermined trigger being selected from a change in a cellular system identification number, a loss of a cellular signal, a state of no cellular service, a power transition change, an ignition cycle, entering DRx mode, exiting DRx mode, a background scan on a predetermined network based on a cellular system identification number, a network change, a new network parameter, a change in a network parameter, a pilot channel change, a call failure, and combinations thereof;
in response to the scanning, creating a connection over the first network; and
reporting the second result by transmitting at least some data stored during the scanning from the telematics unit to a remote location in selective communication with the telematics unit, the data being selected from a cellular system identification number at a beginning and an end of the scan, a timestamp at a beginning and an end of the scan, a GPS location at a beginning and an end of the scan, a received signal strength at a beginning and an end of the scan, a frame error rate at a beginning and an end of the scan, a pilot strength to interference ratio at a beginning and an end of the scan, a power level at a beginning and an end of the scan, a loss of service, a time at which a network access device is unavailable, a protocol version revision, information related to a registration period, a type of scan, and combinations thereof.

20. The method of claim 19 wherein the reporting of the second result occurs during the connection over the first network.

* * * * *